(12) United States Patent
Bai et al.

(10) Patent No.: US 8,341,095 B2
(45) Date of Patent: Dec. 25, 2012

(54) SUPERVISED SEMANTIC INDEXING AND ITS EXTENSIONS

(75) Inventors: Bing Bai, Plainsboro, NJ (US); Jason Weston, New York, NY (US); Ronan Collobert, Princeton, NJ (US); David Grangier, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 534 days.

(21) Appl. No.: 12/562,802

(22) Filed: Sep. 18, 2009

(65) Prior Publication Data

US 2010/0179933 A1 Jul. 15, 2010

Related U.S. Application Data

(60) Provisional application No. 61/143,942, filed on Jan. 12, 2009.

(51) Int. Cl.
*G06F 15/18* (2006.01)
*G06F 7/00* (2006.01)
*G06F 3/00* (2006.01)

(52) U.S. Cl. ............. 706/12; 706/15; 707/705; 715/700

(58) Field of Classification Search .................... None
See application file for complete search history.

(56) References Cited

U.S. PATENT DOCUMENTS

| | | | | |
|---|---|---|---|---|
| 2010/0082613 A1* | 4/2010 | Liu et al. | ........................ | 707/726 |
| 2010/0262454 A1* | 10/2010 | Sommer et al. | ................. | 705/10 |

OTHER PUBLICATIONS

Balasubramanian et al. The Isomap algorithm and topological stability. www.sciencemag.org. Science. vol. 295 . Jan. 2002. (3 Pages) http://www.sciencemag.org/cgi/reprint/295/5552/7a.pdf.

Belkin et al. Laplacian Eigenmaps for Dimensionality Reduction and Data Representation. Advances in Neural Information Processing Systems 14 . Dec. 2002. pp. 1-28.

Bengio et al. Out-of-sample extensions for LLE, isomap, MDS, eigenmaps, and spectral clustering. Advances in Neural Information Processing Systems 16. 2004. (8 Pages).

Blei et al. Latent Dirichlet Allocation. Journal of Machine Learning Research. vol. 3. Jan. 2003. pp. 993-1022.

Burges et al. Learning to rank using gradient descent. In ICML 2005, In Proceeding of the 22th International Conference on Machine Learning. Aug. 2005. pp. 89-96.

Collins et al. New ranking algorithms for parsing and tagging: kernels over discrete structures, and the voted perceptron. In Proceedings of the 40th Annual Meeting on Association for Computational Linguistics. Association for Computational Linguistics. Jul. 2002. pp 263-270.

(Continued)

*Primary Examiner* — Alan Chen
(74) *Attorney, Agent, or Firm* — James Bitetto; Joseph Kolodka

(57) ABSTRACT

A system and method for determining a similarity between a document and a query includes building a weight vector for each of a plurality of documents in a corpus of documents stored in memory and building a weight vector for a query input into a document retrieval system. A weight matrix is generated which distinguishes between relevant documents and lower ranked documents by comparing document/query tuples using a gradient step approach. A similarity score is determined between weight vectors of the query and documents in a corpus by determining a product of a document weight vector, a query weight vector and the weight matrix.

13 Claims, 6 Drawing Sheets

OTHER PUBLICATIONS

Collobert et al. Fast Semantic Extraction Using a Novel Neural Network Architecture. 45th Annual Meeting of the Association for Computational Linguistics, Proceedings of the Conference. ACL. Jun. 2007. (8 pages).

Deerwester et al. Indexing by latent semantic analysis. Journal of the American Society for Information Science, vol. 41. 1990. pp. 391-407.

Grangier et al. Inferring document similarity from hyperlinks. In CIKM '05. ACM. Oct. 2005. pp. 359-360.

Grangier et al. A discriminative kernel-based approach to rank images from text queries. IEEE Transactions on Pattern Analysis and Machine Intelligence. PAMI. vol. 30, Issue: 8. Aug. 2008. pp. 1-14.

Herbrich et al. Large margin rank boundaries for ordinal regression. Advances in Large Margin Classifers. Mar. 2000. pp. 115-132.

Hofmann. Probabilistic latent semantic Indexing. Proceedings of the Twenty-Second Annual International SIGIR Conference on Research and Development in Information Retrieval. In SIGIR. Aug. 1999. pp. 50-57.

Joachims. Optimizing search engines using clickthrough data. In ACM SIGKDD '02. International Conference on Knowledge Discovery and Data Mining. Proceedings of the eighth ACM SIGKDD international conference on Knowledge discovery and data mining, 2002, pp. 133-142, (10 Pages).

Keller et al. A Neural network for Text Representation. In International Conference on Artificial Neural Networks. Sep. 2005. (6 Pages).

Roweis et al. Nonlinear dimensionality reduction by locally linear embedding. www.sciencemag.org. Science. vol. 290. Dec. 2000. pp. 2323-2326.

Salakhutdinov et al. Semantic Hashing. In proceedings of the SIGIR Workshop on Information Retrieval and Applications of Graphical Models. vol. 41 No. 2. Dec. 2007. (8 Pages).

Scholkopf et al. Kernel principal component analysis. Advances in kernel methods: support vector learning. 1999. (6 Pages).

Shi et al. Hash kernels. In Twelfth International Conference on Artificial Intelligence and Statistics. Apr. 2009. (8 Pages).

Sun et al. Supervised latent semantic indexing for document categorization. IEEE Computer Society. In ICDM 2004. ICDN '04: Proceedings of the Fourth IEEE International Conference on Data Mining. Nov. 2004. pp. 535-538.

* cited by examiner

US 8,341,095 B2

SUPERVISED SEMANTIC INDEXING AND ITS EXTENSIONS

RELATED APPLICATION INFORMATION

This application claims priority to provisional application Ser. No. 61/143,942 filed on Jan. 12, 2009, incorporated herein by reference.

BACKGROUND

1. Technical Field

The present invention relates to informational retrieval technology and more particularly to systems and methods for text document matching and ranking.

2. Description of the Related Art

Ranking text documents given a text-based query is one of the key tasks in information retrieval. Classical vector space models use weighted word counts and cosine similarity. This type of model often performs remarkably well, but suffers from the fact that only exact matches of words between query and target texts contribute to the similarity score. It also lacks the ability to adapt to specific datasets since no learning is involved.

Latent Semantic Indexing (LSI), and related methods such as probabilistic Latent Semantic Indexing (pLSA), and Latent Dirichlet Allocation (LDA) choose a low dimensional feature representation of "latent concepts", and hence words are no longer independent. A support vector machine with hand-coded features based on the title, body, search engine rankings and the URL has also been implemented, as well as neural network methods based on training of a similar set of features. Other methods learned the weights of orthogonal vector space models on Wikipedia links and showed improvements over the OKAPI method. The same authors also used a class of models for matching images to text. Several authors have proposed interesting nonlinear versions of (unsupervised) LSI using neural networks and showed they outperform LSI or pLSA. However, we note their method is rather slow, thus dictionary size is limited.

SUMMARY

A system and method for determining a similarity between a document and a query includes building a weight vector for each of a plurality of documents in a corpus of documents stored in memory and building a weight vector for a query input into a document retrieval system. A weight matrix is generated which distinguishes between relevant documents and lower ranked documents by comparing document/query tuples using a gradient step approach. A similarity score is determined between weight vectors of the query and documents in a corpus by determining a product of a document weight vector, a query weight vector and the weight matrix. The number of parameters of this basic model is quadratic to the dictionary size, hence is not good for collection with large vocabulary. We extended several ways to control the problem size, which yields not only better efficiency but also better accuracy. We also have several non-linear extensions to achieve better performance.

A system for determining a similarity between a document and a query includes a user interface configured to permit a user to pose a query to find relevant documents, each document having a weight vector stored in memory. A processing device is configured to build a weight vector for the query. A weight matrix is stored in memory and configured to distinguish between relevant documents and lower ranked documents by comparing document/query tuples using a gradient step approach. A program is configured to determine a similarity score between weight vectors of the query and documents in a corpus by determining a product of a document weight vector, a query weight vector and the weight matrix.

The system program may include one or more of a method for sparsification of the weight matrix, a method to implement low ranking approximations, a method to perform correlated feature hashing (CFH), a method for polynomial modeling of word features, a method for half-transductive modeling, a method for sliding window mapping, and a method for flexible dimensionality for word embedding.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
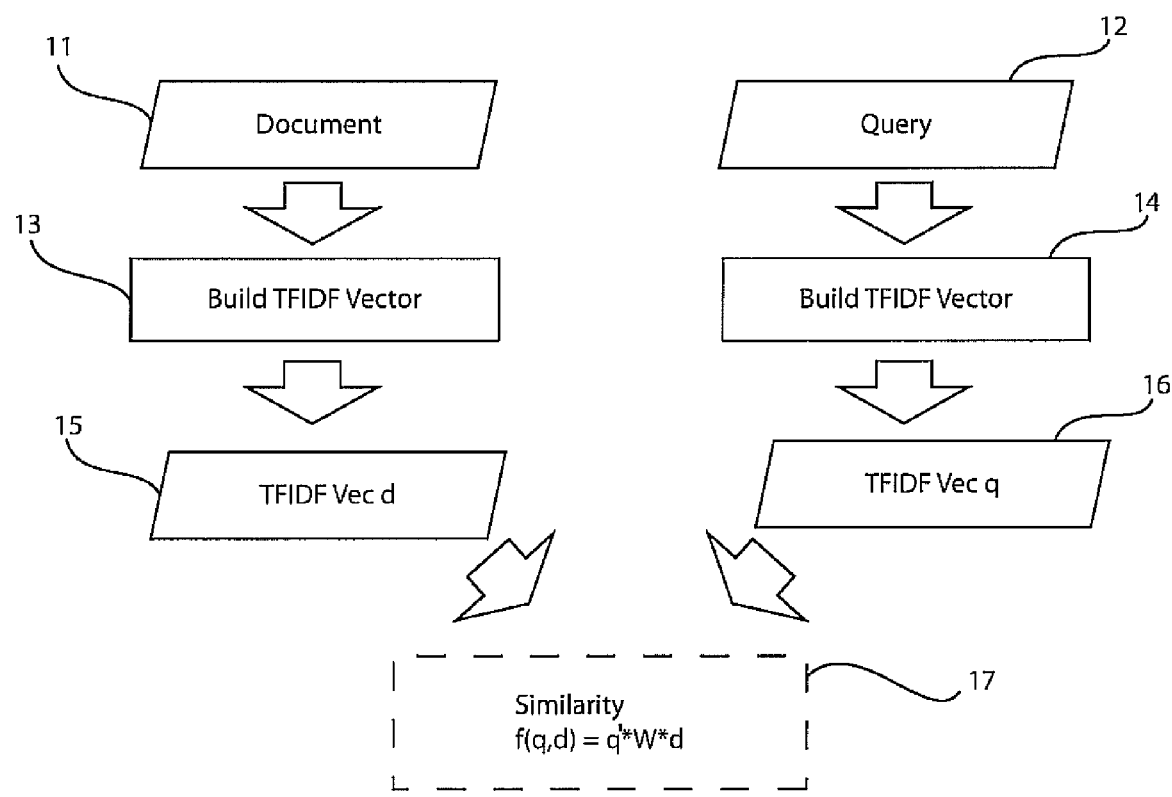
FIG. 1 is a block/flow diagram showing a system/method for determining similarity between a query and a document.

In accordance with the present principles, a class of models is provided that are discriminatively trained to directly map from word content in a query-document or document-document pair to a ranking score. Like Latent Semantic Indexing (LSI), the present models account for correlations between words (e.g., synonymy, polysemy). However, unlike LSI, the present models are trained with a supervised signal (for example, an expert's judgment on whether a document is relevant to a query, or links among documents) directly on the task of interest, which is one reason for superior results. As the query and target texts are modeled separately, the present approach can easily be generalized to other retrieval tasks as well, such as cross-language retrieval. An empirical study is provided on a retrieval task based on Wikipedia documents, where we obtain state-of-the-art performance using the present method.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Supervised Semantic Indexing: We illustratively define a similarity function between a query and a document as:

$$f(q, d) = q^T W d = \sum_{i,j} w_{ij} q_i d_j$$

where q and d are feature vectors of query and document, respectively. Each feature in a feature vector could be an individual word, its weight can be, for instance, a TFIDF value. W is a weight matrix and T is the transpose function. We can see that $w_{ij}$ models correlation between the ith feature of query q and jth feature of d.

Sparse W matrix: We consider both memory and speed considerations. Firstly, this method so far assumes that W fits in memory. For example, if the dictionary size D=30000, then this needs, e.g., 3.4 Gb of RAM (assuming oats). The vectors q and d are sparse so the speed of computation of a single query-document pair involves mn computations of $w_{ij} q_i d_j$, where q and d have m and n nonzero terms, respectively. We have found this is reasonable for training, but may be an issue at test time. Alternatively, one can compute $v = q^T W$ once, and then compute vd for each document. This is the same speed as a classical vector space model where the query contains D terms, assuming W is dense.

Sparse W matrices: If W was itself a sparse matrix, then computation of f(x) would be considerably faster. If the query has m nonzero terms, and any given column of W has p nonzero terms, then the method is at most mp times slower than a classical vector space model. We can enforce W to be sparse using standard feature selection algorithms; we hence generalize the known "Recursive Feature Elimination" algorithm yielding a simple, intuitive method:

1. First, we train the model with a dense matrix W as before.
2. For each column i of W find the k active elements with the smallest values of $|w_{ij}|$. Constrain these elements to equal zero (make them inactive).
3. Train the model with the constrained W matrix.
4. If W contains more than p nonzero terms in each column go back to 2.

Low rank W matrices: An alternative efficient scheme is to constrain W in the following way:

$$W = U^T V + I$$

This induces a low dimensional "latent concept" space in a similar way to LSI. However, it differs in several ways: most importantly it is trained with a supervised signal. Further, U and V differ so it does not assume a query and a target document should be embedded in the same way, and the addition of the identity term (I) means this model automatically learns the tradeoff between using the low dimensional space and a classical vector space model. In terms of efficiency however—it is the same: its speed depends on the dimensionality of U and V.

We also highlight several variants:

1. W=I: if q and d are normalized TFIDF vectors, this is equivalent to using the standard cosine similarity with no learning (and no synonymy or polysemy).
2. W=D: where D is a diagonal matrix: one learns a re-weighting of TFIDF using labeled data.
3. $W = U^T U + I$: we constrain the model to be symmetric; the query and target document are treated in the same way.

Polynomial Features and Low Rank Approximation: A ranking function may include: $f(q,d) = q^T W d$ where q and d are vectors to be ranked, W is a weight and T is the transpose function. If one were to concatenate the vectors q and d: v=(q,d) and then using a polynomial mapping $\Phi(\bullet)$: $f(q,d) = w^T \Phi(v)$, i.e., take all pairwise terms, one ends up with a ranking function: $f(q,d) = q^T W_1 q + q^T W_2 d + d^T W_3 d$ with three "W" matrices to learn. The first term $q^T W_1 q$ is useless since it is the same for all target documents. Although this term is not affected by the query at all, it corresponds to ranking a document's "importance" in a static way, which can still be useful. However, in the present case this static ranking is learned using a supervised signal.

Furthermore, in general, we could consider $\Phi(\bullet)$ to be a polynomial of an order greater than 2. Although this can be computationally challenging, it can again be sped up using a low rank approximation. For example, if we would like the ranking function: $f(q,d) = W_{ijk} q_i d_j d_k$. We can do that with a low rank approximation:

$$f(q, d) = \sum_{i=1}^{n} (Uq)_i (Vd)_i (Yd)_i.$$

This corresponds to embedding the query into an n-dimensional space using the mapping U, embedding the target document twice with two separate functions V and Y also in n-dimensional spaces. Then, the product of all three is taken for each dimension of the embedding space. If there are only two embedding spaces U and V, this reduces to the original ranking function. This can be generalized to more than three embeddings (e.g., more than degree 3).

Convolutions or Sliding Windows: In general, if we have an embedding $t(q_i)$ where $q_i$ is the $i^{th}$ sliding window in a text, we could embed the document with:

$$f(q, d) = \left( \sum_i t(q_i) \right)^T \left( \sum_i t(d_i) \right).$$

One could choose a function t which is a nonlinear neural network based on embedding words, one could use a multi-layer network with sigmoid functions, or one could apply a similar process using polynomials as described above—but instead apply a polynomial map to n-grams (i.e. within a sliding window). For example, for 2-grams containing two words $w_1$ and $w_2$ one might want to consider the following mapping. If $g(w_i)$ is the embedding of the word $w_i$, one uses the mapping:

$$t(d_i) = \sum_j g(w_1)_j g(w_2)_j.$$

This can be generalized to n-grams, and basically consists of only using some of the polynomial terms. Alternatively, one could hash n-grams.

Transductive embedding: Each document could have its own embedding vector $V_i$ (Could be done for advertisements too, e.g., for Yahoo). Note this embedding may not be a function. In other words, it is not necessary to find function $V=f(v)$. We can add one of the following constraints:

1. $V_{d+}^T V_w > V_{d-}^T V_w$—train word embedding with document embedding together, where w is in d+, but not in d−.
2. $V_{d+}^T f(d+) > V_{d+}^T f(d-)$ train functional embedding with transductive embedding. Again, note $V_d^T \neq f(d)$, instead, they have nonlinear relationship.

Reducing the dimensionality of infrequent words: One can introduce capacity control (and lower the memory footprint) by making the representation of each word a variable rather than a fixed dimension. The idea is that infrequent words should have less dimensions because they cannot be trained as well anyway. To make this work, a linear layer maps from a reduced dimension to the full dimension in the model. If a particular word w has dim(w) dimensions then the first dim(w) rows of a d by d matrix M are used to linearly map it to d dimensions, the matrix M is learned along with the representations of each word.

Hashing: Random Hashing of Words: One could embed a document using the average of B "bin" vectors rather than using words. One randomly assigns any given word to n (e.g., n=2 or 3) bins. In this way, rare words are still used but with a smaller number of features, making lower capacity and smaller memory footprint models.

Hashing n-grams: One could also use this trick to, e.g., hash n-grams, which otherwise would have no way of fitting in memory. To use less features, one could hash a 3-gram by making it the sum of three 2-grams e.g. "the cat sat"→g(the, cat)+g(cat,sat)+g(the,sat), where g (•) is the embedding.

Hashing with Prior Knowledge: One does not have to use random hashing functions. One could find the synonyms of rare words, e.g., use a web search with a DICE score (a known measuring score) to pick out the n most related words that have a frequency>F, e.g., F=30,000. We then bin that word into the n bins. In this way, rare words are represented by their synonyms resulting in less capacity models that should be smarter than random hashing. In general, if one has prior knowledge, one might always be able to do better than random hashing.

Referring now to the drawings in which like numerals represent the same or similar elements and initially to FIG. 1, a block/flow diagram for determining similarities between a query and documents is illustratively shown in accordance with the present principles. A class of models can be trained on a supervised signal to provide rankings of a database of documents (d) 11 given a query (q) 12. We learn the relationships among words directly using a weight matrix (W). The present principles provide higher searching quality and faster operation.

Block 11 represents a document d, and block 12 represents a query q. In block 13, a TFIDF vector is built for document d and in block 14, a TFIDF vector is built for query q. In blocks 15 and 16, TFIDF vectors Td and Tq are generated. In block 17, a similarity score is computed between q and d. As shown, the similarity between the query and the document is described as:

$$f(q, d) = q'Wd = \sum_{i,j} w_{ij} q'_i d_j \qquad (1)$$

The dimension of q and d are of the vocabulary size D (q' is the transpose of q). For illustrative purposes, in Wikipedia, D>2.5 million. So matrix W can be intractably large. Ways to control the size of W will be described herein.

Training: Suppose we are given a set of tuples R (labeled data), where each tuple contains a query q, a relevant document $d^+$ and an irrelevant (or lower ranked) document $d^-$. We choose W such that $q'Wd^+ > q'Wd^-$, expressing that $d^+$ should be ranked higher than $d^-$. For that purpose, we employ a known method called margin ranking loss, and minimize:

$$\sum_{(q,d^+,d^-)} \max_W (0, 1 - q'Wd^+ + q'Wd^-).$$

This optimization problem is solved through stochastic gradient descent, iteratively, one picks a random tuple and makes a gradient step for that tuple:

$$W - \lambda(qd^{+\prime} - qd^{-\prime}), \text{ if } 1 - qd^{+\prime} + qd^{-\prime} > 0.$$

One could exploit the sparsity of q and d when calculating these updates. To train the present model, we choose the (fixed) learning rate λ which minimizes the training error. Stochastic training is highly scalable and is easy to implement for the model. The present method includes a margin ranking perceptron with a particular choice of features. It thus involves a convex optimization problem and is hence related to a ranking SVM, except we have a highly scalable optimizer.

The vector space models for text in accordance with the present principles employ a weight or sparse matrix W (block 17). If W was itself a sparse matrix, then computation of f(•) would be considerably faster, not to mention significant memory savings. If the query has m non-zero terms, and any given row of W has p non-zero terms, then there are at most mp terms in v=q'W (compared to mD terms for a dense W, and m terms for a classical vector space cosine).

The simplest way to do this is to apply a regularizer such as minimizing the L1-norm of W:

$$\min_W \left( \gamma \|W\|_1 + \sum_{q \text{ in } Q} L(W, q, d, Y(q, d)) \right) \qquad (2)$$

where L(•) is a function that computes the loss of the current model given a query q in Q and a labeling Y(q,d) of the relevance of the documents d with respect to q. However, in general any sparsity promoting regularizer or feature selection technique could be used.

Training W: We enforce sparsity through feature selection. Here, a "projection" method can be seen as a generalization of the Recursive Feature Elimination (RFE) feature selection method. This method may include the following: 1) Train the model with a dense matrix W as before. 2) For each row i of W, find the k active elements with the smallest values of $W_{ij}$. Constrain these elements to equal zero, i.e., make them inactive. 3) Train the model with the constrained W matrix. 4) If W contains more than p non-zero terms in each row go back to 2).

This method is motivated by the removal of the smallest weights being linked to the smallest change in the objective function and has been shown to work well in several experimental setups. Overall, we found this scheme to be simple and efficient, while yielding good results. Advantageously, feature selection may be applied to supervised semantic indexing (SSI).

Figure 2:
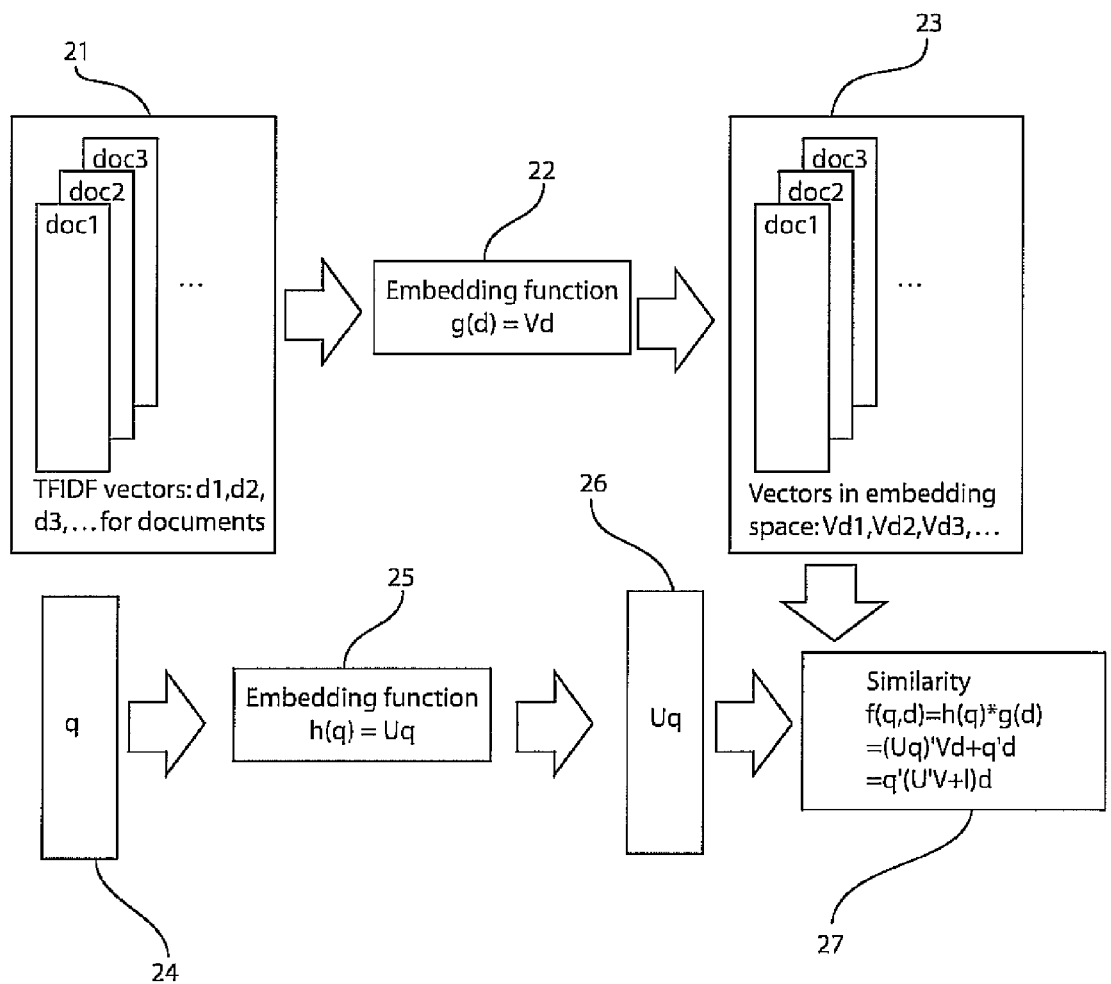
FIG. 2 is a block/flow diagram showing a system/method for simplifying dimensions when determining similarity between a query and a document.

Referring to FIG. 2, a low dimensional simplification method is shown in accordance with the present principles. TFIDF vectors d1, d2, d3, in block 21, for each document (doc1, doc2, doc3, . . . ) go through a linear embedding (e.g., g(d)=Vd) in block 22, and become vectors (Vd1, Vd2, Vd3, . . . ) in embedding space in block 23. A TFIDF vector q in block 24 goes through a linear transform (embedding function) in block 25 (e.g., h(q)=Uq) to become vector Uq in block 26. In block 27, a classical vector space model (q'd) and optimal embedding (q'U'Vd) are combined together. As described in FIG. 2, the query TFIDF vector and the document TFIDF vector are transformed with matrix U and V, respectively in block 22 and 25, before a dot product is conducted. It can be viewed as a special form of Eq. (1), where W=U'V+I (3). Thus, Eq. (1) becomes:

$$f(q,d)=q'Wd=q'U'Vd+q'd \qquad (4)$$

The first term on the right-hand side (q'U'Vd) can be viewed as a dot product of q and d after transformation of U and V, respectively. This term contains synonym/polysemy information and thus allows fuzzy matching. The second term (q'd) is a traditional vector space model similarity, which uses exact word matching. By dropping the second term in Eq. (4), we get:

$$f(q,d)=q'U'Vd \qquad (5).$$

This form is useful for heterogeneous systems where query features and document features are different, e.g. cross-language retrieval. If we model query and document in the same way, Eq. (2) becomes:

$$W=U'U+I \qquad (6).$$

Eq. (6) has fewer parameters to train than Eq. (2), and thus provides for faster training and is less likely to overfit. This can provide better performance.

Training: When the W matrix is constrained, e.g., W=U'V+I training is performed in a similar way as before, but in this case by making a gradient step to optimize the parameters U and V:

$$U \leftarrow U+\lambda V(d^+-d^-)q', \text{ if } 1-f(q,d^+)+f(q,d^-)>0$$

$$V \leftarrow V+\lambda Uq(d^+-s^-)', \text{ if } 1-f(q,d^+)+f(q,d^-)>0$$

Note this is no longer a convex optimization problem. In our experiments, we initialized the matrices U and V randomly using a normal distribution with mean zero and standard deviation one. In block 27, the classical vector space model (q'd) and optimal embedding (q'UVd) are embedded to give better performance. U and V can model query and documents in different ways, thus U and V are good for heterogeneous systems such as systems that perform cross language retrieval (e.g., query is Japanese, but documents are in English).

Figure 3:
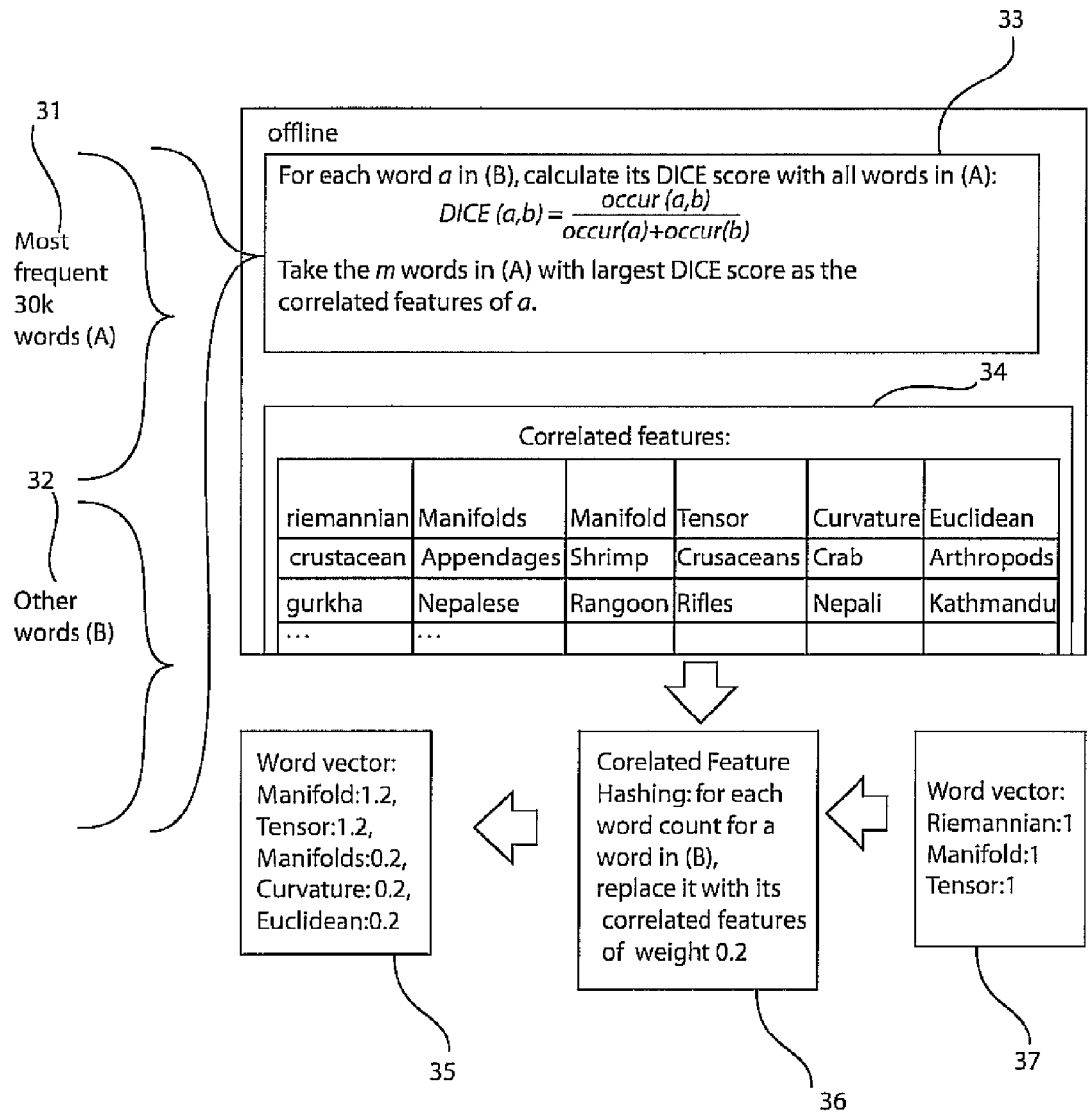
FIG. 3 is a block/flow diagram showing a system/method for correlated feature hashing (CFH) in accordance with one embodiment.

Referring to FIG. 3, a block/flow diagram shows a system/method with correlated feature hashing in accordance with one embodiment. Block 31 includes frequent word storage. Block 32 includes infrequent word storage. Block 33 includes a method to compute correlated features. In block 33, for each word "a" in (B) (infrequent words in block 32), calculate its DICE score with all words in (A) (frequent words in block 31). DICE(a,b)=occur(a,b)/occur(a)+occur(b). Then, take the m words in (A) with the largest DICE score as the correlated features of a. Examples of correlated features are stored in block 34. In block 34, a first column includes infrequent words, the other columns are the top 5 words correlated with the words in the first column. In blocks 37, 36, and 35, recomputed features using the correlated words are stored in block 34. Infrequent words in TFIDF vectors in block 37 are replaced with frequent words, based on the correlated hashing features in block 36. In block 36, correlated feature hashing occurs. This includes, for each word count for a word in (B), replacing the word with its correlated features of weight at least 0.2. Note the weight threshold may be adjusted as needed. Word vectors are output in block 35.

To further reduce the number of features, correlated feature hashing may be introduced. With this method, we limit the features to the most frequent ones (e.g., the most frequent 30,000 words). Any other word, say w, is "hashed" into the 5 words (or at least two) that co-occur with w most often. The co-occurrence can be measured by a "DICE" score in block 33, which is the number of co-occurrences of two words divided by the sum of the occurrences of the two words. The same method can be applied to the features of n-grams. N-grams can be hashed into most co-occurred word features.

Training: Correlated feature hashing can be viewed as a preprocessing stage (e.g., block 201 of FIG. 6). Rare words can be removed from word vectors by mapping them to frequent words. Then, the training can be conducted on the resulting vectors. Correlated feature hashing has more meaningful and effective feature reduction then prior art methods.

Correlated feature hashing includes providing a frequently used dictionary 31 and an infrequently used dictionary 32 in storage memory. For each word or gram in the infrequently used dictionary 32, correlate n words or grams from the frequently used dictionary 32 based on a first score (e.g., DICE score). In block 36, features are replaced for a vector of the infrequently used words or grams with features from a vector of the correlated words or grams from the frequently used dictionary 31 when the features from a vector of the correlated words or grams meet a threshold value (e.g., 0.2). A similarity score between weight vectors of a query and one or more documents is achieved by employing the features from the vector of the correlated words or grams that met the threshold value.

Figure 4:
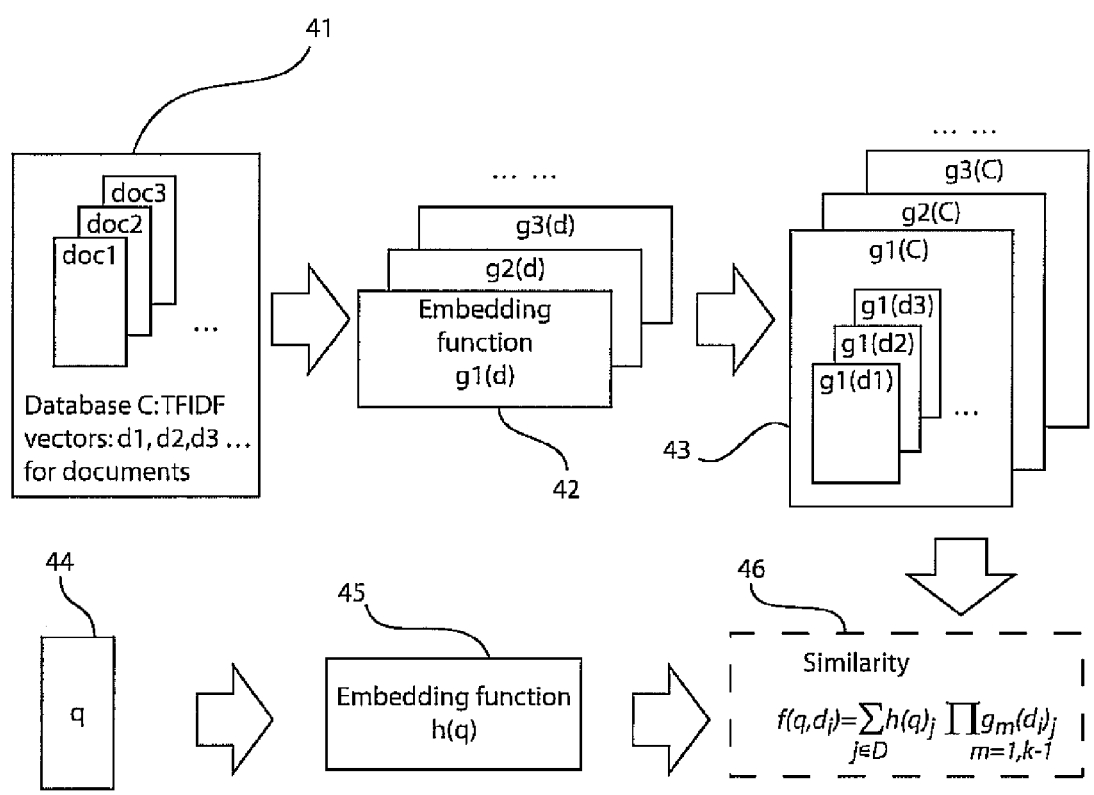
FIG. 4 is a block/flow diagram showing a system/method for determining similarity between a query and a document with a higher order polynomial model.

Referring to FIG. 4, a block/flow diagram illustratively depicts a high-order polynomial model in accordance with another embodiment. The models as described above are all quadratic feature models. However, the models can be extended by extending Eq. (1) to higher order models:

$$f(q,d)=w\cdot\Phi^k([q,d]) \qquad (7)$$

where $\Phi^k(\bullet)$ is a feature map that considers all possible k-degree terms $\Phi^k(x_1, x_2, \ldots, x_n)=<x_{i_1}, x_{i_2}, \ldots, x_{i_k}: 1\leq i_1, i_2, \ldots, i_k \leq D>$.

In query-document ranking, we allow document terms to appear more than once, but limit query terms to appear only once. Also, we only consider the terms with both query terms and document terms. For example, take k=3, we have:

$$f(q,d)=\Sigma_{i,j,k}w_{ijk}q_id_jd_k \qquad (8)$$

Again, to have better scalability, it can be approximated with a low dimension approximation:

$$f(q,d)=\Sigma_{j\in D}h(q),\Pi_{m=1,k-1}g_m(d) \qquad (9)$$

The process of Eq. (9) is depicted in FIG. 4. In block 41, TFIDF vectors are mapped to multiple embedding spaces in block 43 by going through multiple function mappings in block 42. A query TFIDF vector q in block 44 is transformed by function h(q) in block 45. A similarity between q and d is calculated by Eq. 9 in block 46.

If we set k=3, and embedding functions to be linear, we have $$f(q,d) = \Sigma_i (Uq)_i (Vd)_i (Yd)_i \qquad (10).$$

Training: Again, we could adopt the Stochastic Gradient Descent (SGD) method. The gradient can be easily determined using partial derivatives. For formulation in Eq. (8), $w_{ijk} \leftarrow w_{ijk} + \lambda (d_j^+ d_k^+ - d_j^- d_k^-) q_i$, if $1-f(q,d^+)+f(q,d^-)>0$. For formulation in Eq. (10), $U \leftarrow U + \lambda (Vd^+ \otimes Yd^+ - Vd^- \otimes Yd^-) q'$, if $1-f(q,d^+)+f(q,d^-)>0$; $V \leftarrow V + \lambda (Uq \otimes Yd^+ - Uq \otimes Yd^-)(d^+-d^-)'$, if $1-f(q,d^+)+f(q,d^-)>0$; and $Y \leftarrow Y + \lambda (Uq \otimes Vd^+ - Uq \otimes Yd^-)(d^+-d^-)'$, if $1-f(q,d^+)+f(q,d^-)>0$ where operator $\otimes$ is a component-wise product of vectors, i.e., $(A \otimes B)_i = A_i B_i$.

Advantageously, Eq. (8) provides significant improvements in document ranking. Eq. (9) can be viewed as a generalized dot product, which simplifies the superior document ranking capabilities of Eq. (8).

Half-transductive Ranking: Eq. (5) can be viewed as dot product of two functions:

$$f(q,d) = \phi_1(q) \cdot \phi_2(d) = (Uq)'(Vd) \qquad (10)$$

where two function (linear) mappings are $\phi_1(\bullet)$ and $\phi_1(\bullet)$ and the parameters being features in original feature space. This method is also called functional embedding because new samples can be put into embedding space using function $\phi(\bullet)$. Another important category of learning methods is transductive learning. This method assigns a vector $v_i \in R^m$ to each object $y_i \in Y$ that will be learned using a supervised or unsupervised signal and does not involve any feature representation of $y_i$. Instead, the embedding only uses information of relative distances between $y_i, y_j \in Y$. In this sense, it can be said to be a nonlinear method. Ranking is then typically achieved by measuring the distances in the embedding space (Euclidean distance or dot product similarity). This method provides a point-to-point correspondence between the input space and the intrinsic space in which the data lie. Such methods have multiplied in recent years and are most commonly rooted either in factor analysis (e.g., principal component analysis) or multidimensional scaling and their variants: e.g., kernel PCA, Isomap, Locally Linear Embedding and Laplacian Eigenmaps. In many cases, transductive learning gives outstanding performance for clustering applications. The drawback of this method is that, the query has to be one of the objects $y_i \in Y$ for this approach to make sense as only these objects are embedded. Out-of-sample extension methods have to be adopted for new samples.

In accordance with the present principles, we can combine the functional embedding and transductive embedding, using the following half transductive model:

$$f(q,d_i) = M(\phi(q), v_i) \qquad (11)$$

where $\phi(q)$ is the functional embedding for new queries, while $v_i$ is the nonlinear embedding to give better performance. Specifically, if we require $\phi(q)$ to be a linear function, Eq. (11) becomes:

$$f(q,d_i) = M(Wq, v_i) \qquad (12).$$

Training: We can adopt a gradient-descent based optimization method. For Eq. (11), the derivative of function M and $\phi$ can be calculated and used in adjusting parameters. For the transductive part $v_i$, technology like "lookup table" can be used.

Advantageously, the new framework for half-transductive learning is provided. Half of the formulation is functional which handles new sample embedding, while the other half is transductive which provides better performance for existing databases.

Sliding window based embedding function: In general if we have an embedding $t(q_i)$ where $q_i$ is the ith sliding window in a text, we could embed the document with: $f(q,d) = \Sigma_i (t(q_i))^T \cdot \Sigma_j (t(d_j))$ or its normalized version:

$$f(q,d) = \frac{1}{m} \sum_{i \in [1,m]} (t(q_i))^T \cdot \frac{1}{n} \sum_{j \in [1,n]} (t(d_j)).$$

One could choose a function which is a nonlinear neural network based on embedding words, one could use a multi-layer network with sigmoid functions, or could apply a similar process as in the section on polynomials above (but instead to apply a polynomial map to n-grams, within a sliding window)). For example, for 2-grams containing two words $w_1$ and $w_2$ one might want to consider the following mapping. If $g(w_i)$ is the embedding of the word $w_i$, one uses the mapping: $t(d_i) = \Sigma_j g(w_1)_j g(w_2)_j$: This can be generalized to n-grams. This basically includes using only some of the polynomial terms.

Reducing the dimensionality of infrequent words: One can introduce capacity control (and lower the memory footprint) by making the representation of each word a variable rather than fixed dimension. The idea is that infrequent words should have fewer dimensions because they cannot be trained as well anyway. To make this work a linear layer maps from a reduced dimension to the full dimension in the model. If a particular word w has dim(w) dimensions, then the first dim (w) rows of a d×d matrix M are used to linearly map the word to d dimensions. The matrix M is learned along with the representations of each word.

Figure 5:
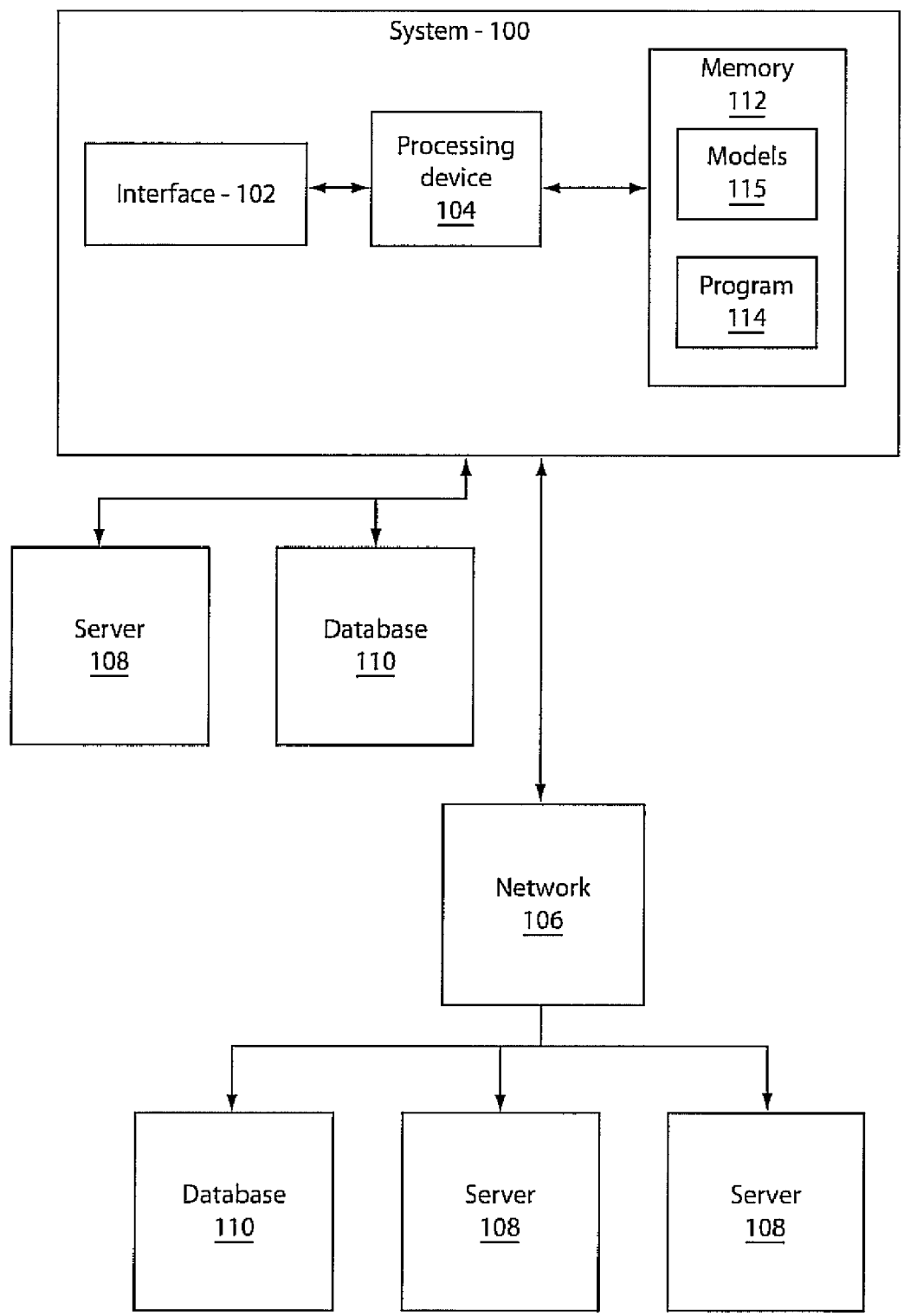
FIG. 5 is a block diagram showing a system for conducting searches and/or retrieving documents in accordance with one embodiment.

Referring to FIG. 5, a system 100 is illustratively depicted for carrying out document ranking, document retrieval and text/document analysis in accordance with the present principles. In accordance with one embodiment, system 100 includes at least one terminal or processing device 104 having a user interface 102. The user can present queries or perform documents searches through interface 102. System 100 includes memory 112, which may itself include documents or items that can be queried by the user. The memory 112 stores a program 114 (or programs), which implement the methods in accordance with the present principles. For example, program 114 may learn to rank documents or items using word features. Such learning may include learning with a basic model in accordance with the present embodiments. This basic model may be employed in text-image ranking, or in text-text ranking. The program 114 may include methods for sparsification of a weight matrix or implement low ranking approximations as described hereinabove. Memory 112 and program 114 may be employed to perform correlated feature hashing (CFH). Other aspects of the present principles that may be implemented by program 114 may include polynomial modeling of word features, half-transductive modeling, sliding window mapping, and flexible dimensionality for word embedding. It should be understood that the many aspects described in accordance with the present principles can be employed together in various combinations. For example, half-transductive modeling may be employed with sliding window mapping, and correlated feature hashing (CFH) may be employed with any of the embodiments described herein.

System 100 may interact with local servers 108 and databases 110 or remote servers 108 and databases 110 through a network 106. These databases 110 and servers 108 may include the documents or items to be searched using a user or machine generated query. It should be understood that the program 114 may be remotely disposed from system 100, e.g., located on a server or the like. Training of models may be performed on system 100 or may be performed on other platforms to create models 115 for implementing the present methods.

Figure 6:
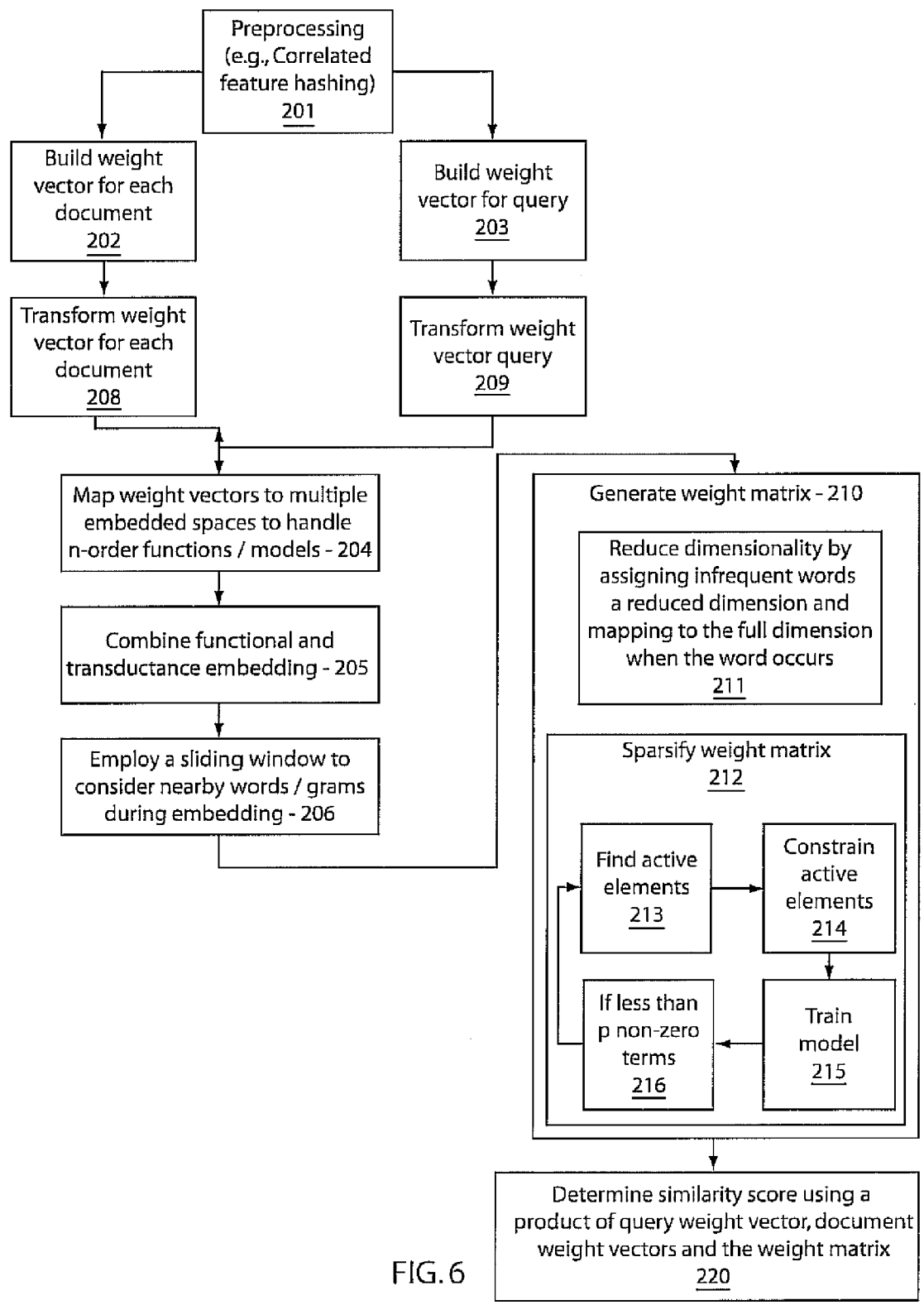
FIG. 6 is a block/flow diagram showing a more detailed system/method for determining similarity between a query and a document in accordance with the present principles.

Referring to FIG. 6, a method for determining a similarity between a document and a query is illustratively shown. The method may be employed for document ranking, document retrieval or any other analysis that employs similarity scores between a query and documents. In block 201, a preprocessing step may be employed for correlated feature hashing (CFH) as described in FIG. 3.

In block 202, a weight vector for each of a plurality of documents in a corpus of documents is built and stored in memory. In block 203, a weight vector is built for a query input into a document system. The weight vectors may include Term Frequency Inverse Document Frequency (TFIDF) weight vectors, although other feature vectors are also contemplated.

In one embodiment, the weight vectors for the plurality of documents are mapped to multiple embedding spaces to handle models having polynomial functions of n-order in block 204. In another embodiment, functional embedding and transductance embedding are combined to transform weight vectors to model both new queries and improve performance in existing databases in block 205. In block 206, a sliding window may be employed while embedding words or grams to consider other words or grams in proximity thereof.

In one simplifying embodiment, in block 208, building a weight vector for each of a plurality of documents includes performing a linear embedding to transform the weight vector to embedding space using a matrix U, and in block 209, building a weight vector for a query includes performing a linear embedding to transform the weight vector to embedding space using a matrix V.

In block 210, a weight matrix (W) is generated which distinguishes between relevant documents and lower ranked documents by comparing document/query tuples using a gradient step approach. Other comparison techniques may also be employed.

In block 211, the weight matrix generation may include assigning infrequently occurring words to a reduced dimension representation; and mapping the reduced dimension representation to a full dimension representation when the infrequently occurring words are encountered. The weight matrix may be sparsified through feature selection in block 212. Sparification may include finding active elements in the weight matrix with smallest weight values in block 213 by searching the matrix row by row. The active elements in the weight matrix are constrained with smallest weight values set to equal zero in block 214. In block 215, a model is trained with the weight matrix, and, in block 216, if the weight matrix includes more than p non-zero terms, returning to the finding step (block 213). The result is a sparsely populated weight matrix to improve computation time and reduce memory and computational overhead.

In block 220, a similarity score is determined between weight vectors of the query and documents in a corpus by determining a product of a document weight vector, a query weight vector and the weight matrix. In the simplified embodiment, determining the similarity score includes taking a product between a transformed document weight vector (block 208) and a transformed query weight vector (block 209) to simplify computations.

It should be understood that blocks 204, 205, 206, 211, 212 are all alternative options to decide similarity score f(q,d). Although these techniques can be combined, they may be employed independently or combined in any order.

Having described preferred embodiments of systems and methods for supervised semantic indexing and its extensions (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for determining a similarity between a document and a query, comprising:
    building a weight vector for each of a plurality of documents in a corpus of documents stored in memory;
    building a weight vector for a query input into a document retrieval system;
    generating a weight matrix which distinguishes between relevant documents and lower ranked documents by comparing document/query tuples using a gradient step approach; and
    determining a similarity score between weight vectors of the query and documents in a corpus by determining a product of a document weight vector, a query weight vector and the weight matrix.

2. The method as recited in claim 1, wherein the weight vectors include Term Frequency Inverse Document Frequency (TFIDF) weights.

3. The method as recited in claim 1, further comprising sparsifying the weight matrix through feature selection.

4. The method as recited in claim 3, wherein sparsifying includes:
    finding active elements in the weight matrix with smallest weight values;
    constraining the active elements in the weight matrix with smallest weight values to equal zero;
    training a model with the weight matrix; and
    if the weight matrix includes more than p non-zero terms, returning to the finding step.

5. The method as recited in claim 1, wherein building a weight vector for each of a plurality of documents includes performing a linear embedding to transform the weight vector to embedding space using a matrix U.

6. The method as recited in claim 5, wherein building a weight vector for a query includes performing a linear embedding to transform the weight vector to embedding space using a matrix V.

7. The method as recited in claim 6, wherein determining a similarity score includes taking a product between transformed document and query weight vectors to simplify computations.

8. The method as recited in claim 1, wherein building a weight vector for each of a plurality of documents in a corpus of document includes mapping the weight vectors for the plurality of documents to multiple embedding spaces to handle models having polynomial functions of n-order.

9. The method as recited in claim 1, further comprising combining functional embedding with transductive embedding to transform weight vectors to model both new queries and improve performance in existing databases.

10. The method as recited in claim 1, wherein building a weight vector includes mapping the weight vector using a sliding window while embedding words or grams to consider other words or grams in proximity thereof.

11. The method as recited in claim 1, wherein generating a weight matrix includes:
   assigning infrequently occurring words to a reduced dimension representation; and
   mapping the reduced dimension representation to a full dimension representation when the infrequently occurring words are encountered.

12. A system for determining a similarity between a document and a query, comprising:
   a user interface configured to permit a user to pose a query to find relevant documents, each document having a weight vector stored in memory;
   a processing device configured to build a weight vector for the query;
   a weight matrix stored in memory and configured to distinguish between relevant documents and lower ranked documents by comparing document/query tuples using a gradient step approach; and
   a program configured to determine a similarity score between weight vectors of the query and documents in a corpus by determining a product of a document weight vector, a query weight vector and the weight matrix.

13. The system as recited in claim 12, wherein the program includes one or more of a method for sparsification of the weight matrix, a method to implement low ranking approximations, a method to perform correlated feature hashing (CFH), a method for polynomial modeling of word features, a method for half-transductive modeling, a method for sliding window mapping, and a method for flexible dimensionality for word embedding.

\* \* \* \* \*